(12) United States Patent
Casali et al.

(10) Patent No.: US 12,344,283 B2
(45) Date of Patent: Jul. 1, 2025

(54) GREASING SLEEVE

(71) Applicant: FURRER + FREY AG, Bern (CH)

(72) Inventors: Bruno Casali, Toffen (CH); Michael Rietmann, Solothurn (CH)

(73) Assignee: FURRER + FREY AG, Bern (CH)

( * ) Notice: Subject to any disclaimer, the term of this patent is extended or adjusted under 35 U.S.C. 154(b) by 0 days.

(21) Appl. No.: 18/739,960

(22) Filed: Jun. 11, 2024

(65) Prior Publication Data

US 2024/0326879 A1    Oct. 3, 2024

Related U.S. Application Data

(62) Division of application No. 17/434,308, filed as application No. PCT/IB2020/051456 on Feb. 21, 2020, now Pat. No. 12,043,293.

(30) Foreign Application Priority Data

Feb. 27, 2019  (EP) ..................... 19020093

(51) Int. Cl.
*B61B 12/08*  (2006.01)
*B60M 1/28*  (2006.01)

(52) U.S. Cl.
CPC .............. *B61B 12/08* (2013.01); *B60M 1/28* (2013.01)

(58) Field of Classification Search
CPC .................................................. F16N 2210/34
See application file for complete search history.

(56) References Cited

U.S. PATENT DOCUMENTS

| 2,435,120 A | * | 1/1948 | Baker | D07B 7/12 |
| | | | | 118/421 |
| 2,665,773 A | * | 1/1954 | Osmun | E21B 33/08 |
| | | | | 184/15.1 |
| 3,736,618 A | * | 6/1973 | Ramsey | D07B 7/12 |
| | | | | 15/309.1 |
| 3,985,211 A | * | 10/1976 | Bommart | B60M 1/13 |
| | | | | 191/40 |
| 4,046,225 A | * | 9/1977 | Shenk | H01B 13/228 |
| | | | | 184/15.1 |

(Continued)

FOREIGN PATENT DOCUMENTS

| CN | 108657022 A | * | 10/2018 | .............. B60M 1/28 |
| CN | 112622706 A | * | 4/2021 | |

(Continued)

*Primary Examiner* — Michael A Riegelman

(57) ABSTRACT

The invention relates to a greasing device for a contact wire which can be clamped into a conductor rail for the electrical energy supply of a pantograph of a rail vehicle, comprising:
 a basic body extending in a longitudinal direction, a transverse direction perpendicular to the longitudinal direction and a vertical direction perpendicular to the longitudinal direction and perpendicular to the transverse direction,
 a passage opening penetrating the basic body from a front side, seen in the longitudinal direction, to a rear side, seen in the longitudinal direction, through which the contact wire can be pushed in the longitudinal direction, and
 a supply line leading into the passage opening for introducing a grease which can be applied to the contact wire,
 wherein the passage opening as seen in the longitudinal direction after the supply line.

16 Claims, 5 Drawing Sheets

(56) References Cited

U.S. PATENT DOCUMENTS

| | | | | | |
|---|---|---|---|---|---|
| 4,169,427 | A | * | 10/1979 | Crump | B08B 3/024 |
| | | | | | 134/172 |
| 4,422,529 | A | * | 12/1983 | Johansen | B66D 1/28 |
| | | | | | 184/15.1 |
| 4,498,558 | A | * | 2/1985 | Bendahan | D07B 7/12 |
| | | | | | 277/543 |
| 4,543,683 | A | * | 10/1985 | Goldman | B63B 59/00 |
| | | | | | 15/104.04 |
| 4,570,285 | A | * | 2/1986 | Skelton | B63B 21/14 |
| | | | | | 15/160 |
| 4,749,059 | A | * | 6/1988 | Jonnes | F16N 7/12 |
| | | | | | 118/DIG. 18 |
| 4,982,473 | A | * | 1/1991 | Farris | B08B 1/32 |
| | | | | | 118/DIG. 21 |
| 5,022,493 | A | * | 6/1991 | Buckelew | A47L 25/00 |
| | | | | | 15/210.1 |
| 5,368,128 | A | * | 11/1994 | Waldchen | F16N 7/00 |
| | | | | | 239/565 |
| 5,957,254 | A | * | 9/1999 | Furrer | B60M 1/12 |
| | | | | | 191/40 |
| 9,233,626 | B2 | * | 1/2016 | Furrer | B60M 1/24 |
| 10,730,721 | B2 | * | 8/2020 | Kato | B08B 1/165 |
| 2006/0102430 | A1 | * | 5/2006 | Griffioen | H02G 1/086 |
| | | | | | 184/15.1 |
| 2015/0224896 | A1 | * | 8/2015 | Furrer | B60M 1/24 |
| | | | | | 174/70 B |
| 2022/0074137 | A1 | * | 3/2022 | Velichko | D07B 7/12 |
| 2022/0144099 | A1 | * | 5/2022 | Casali | B60L 5/24 |
| 2022/0170590 | A1 | * | 6/2022 | Casali | B60M 1/30 |

FOREIGN PATENT DOCUMENTS

| | | | | |
|---|---|---|---|---|
| EP | 80423 A | * | 6/1983 | B61B 12/08 |
| EP | 343340 A | * | 11/1989 | B08B 1/02 |
| EP | 0593350 A1 | * | 11/1993 | |
| FR | 2596295 A | * | 10/1987 | B05B 13/0214 |
| KR | 20210011101 A | * | 2/2021 | |

* cited by examiner

GREASING SLEEVE

CROSS-REFERENCE TO RELATED PATENT APPLICATIONS

This application is a divisional application of U.S. application Ser. No. 17/434,308. This application claims priorities from U.S. application Ser. No. 17/434,308, filed Aug. 26, 2021, PCT Application No. PCT/IB2020/051456, filed Feb. 21, 2020, and from the European patent application 19020093.1 filed Feb. 21, 2019, the content of which are incorporated herein in the entirety by reference.

TECHNICAL FIELD

The present invention relates to a greasing device for a contact wire which can be clamped into a conductor rail for the electrical power supply of a pantograph of a rail vehicle and to a method for greasing a contact wire for the electrical power supply of a pantograph of a rail vehicle.

A greasing device according to the preamble of the current claim 1 as well as a method according to the preamble of the current claim 15 are known from ES 2 409 085 A2.

SUMMARY

The object of the invention is to improve the known greasing device and the known method.

The task is fulfilled by the characteristics of the independent claims. Preferred embodiments are the subject matter of the dependent claims.

According to one aspect of the invention, a greasing device for a contact wire which can be clamped into a conductor rail for the electrical power supply of a pantograph of a rail vehicle, comprising a basic body extending in a longitudinal direction, a transverse direction perpendicular to the longitudinal direction and a vertical direction perpendicular to the longitudinal direction and perpendicular to the transverse direction, a passage opening penetrating the basic body from a front side, seen in the longitudinal direction, to a rear side, seen in the longitudinal direction, through which the contact wire can be pushed in the longitudinal direction, and a supply line leading into the passage opening for introducing a grease which can be applied to the contact wire. The shape of the basic body can be arbitrary, and is not limited to the shape of a cuboid or the like.

In accordance with the invention, the passage opening, as seen in the longitudinal direction after the supply line, has a nose oriented against the vertical direction on an upper side, as seen in the vertical direction, which is arranged to press the contact wire against a bottom side of the passage opening, as seen in the vertical direction, so that a groove is cut into the grease applied to the contact wire.

The specified device is based on the consideration that the grease to be applied to the contact wire shall protect it from environmental and other weathering influences. As the conductor rail is usually made of a material which has a very high standard potential difference in the electrochemical series of voltages with respect to the material of the contact wire, water accumulation in the area of the clamping point between the conductor rail and the contact wire very quickly leads to corrosion.

With the greasing device mentioned above, grease can be applied to the contact wire at the clamping point between the conductor rail and the contact wire to avoid the accumulation of water in this area. The problem here, however, is that the grease is applied completely to the contact wire and thus, for example, can be stripped off again by the pantograph of a following rail vehicle during power consumption. This not only leads to an uneconomically high consumption of grease, but the grease that is stripped off also drips down and pollutes the environment.

Here the specified greasing device is based on the idea of removing the grease in the areas of the contact wire which are not part of the clamping points. For this purpose, the nose presses the contact wire to the bottom side of the passage opening so that no grease is applied at all at the point of the contact wire where the pantograph makes contact with the rail vehicle. The area of the contact wire between the two clamping points also remains free of grease as far as possible.

In a further embodiment of the specified greasing device, the passage opening is arranged in a groove formed in a guide body part of the basic body and covered by a cover part of the basic body. In this way, the contact wire can be easily inserted into the basic body, even if it is already suspended in a catenary.

In an additional further embodiment of the specified greasing device, the supply line is guided through the cover part. In this case the cover part can be connected non-positively to the guide body part.

In another embodiment of the specified greasing device, the passage opening has a funnel-shaped area in which an opening width seen in the transverse direction tapers towards the supply line over the longitudinal direction. In this way, the grease is pressed against the contact wire when the contact wire is pulled through the passage opening, resulting in a homogeneous application of grease at the points where the grease is to be applied to the contact wire.

In a further embodiment of the specified greasing device, the funnel-shaped area is designed as an insert to be inserted into the passage opening, so that the funnel-shaped area can be adapted to contact wires of different thicknesses.

In a further embodiment of the specified greasing device, a guide sleeve is arranged in front of the funnel-shaped area as seen in the longitudinal direction, which positions the contact wire at least in the transverse direction. In this way, the contact wire can be positioned centrally in the passage opening, so that the grease application on the left side of the contact wire, seen in the transverse direction, is just as strong as the grease application on the right side of the contact wire, seen in the transverse direction.

In a special embodiment of the specified greasing device, the guide sleeve is composed of two guide sleeve halves which can be connected in the transverse direction. When inserting the contact wire into the groove as described above, the two parts of the guide sleeve can initially be placed simply against the contact wire, whereby tolerances due to inaccurate positioning of the two halves of the guide sleeve relative to each other take effect in the vertical direction, but not in the transverse direction relevant for positioning the contact wire.

In yet another embodiment of the specified greasing device, the nose is arranged in a wiper sleeve arranged after the funnel-shaped area when viewed in the longitudinal direction. The wiper sleeve can be adapted to different wire thicknesses, so that the nose can always be optimally positioned in relation to the contact wire to be greased.

In a preferred embodiment of the specified greasing device, the wiper sleeve is composed of two wiper sleeve halves which can be connected in the vertical direction. In this way, the contact wire can be inserted between the two wiper sleeve halves, and the nose can be pressed onto the contact wire by the abovementioned non-positive connection of the cover part with the guide body part.

In an additional embodiment, the specified greasing device comprises two guide pulleys arranged in the longitudinal direction in front of the front side of the basic body, which are each rotatable about an axis of rotation aligned in the vertical direction and arranged at a distance from each other in the transverse direction at the same height in the vertical direction in order to deflect the contact wire into the passage opening.

In a special embodiment of the specified greasing device, the passage opening on the bottom side is adapted to a shape of the contact wire on a contact wire underside that can be aligned with the pantograph. This ensures that the contact wire is positioned positively in the passage opening with its contact wire underside, so that this side is not greased.

In another specific embodiment, the specified greasing device comprises a connecting coupling held in the longitudinal direction at the front of the basic body for connecting a pulling device designed to pull the basic body in the longitudinal direction. In this way, the specified greasing device can easily be pulled over the contact wire, which can be greased, for example, when laid in a catenary.

In a particularly preferred embodiment of the specified greasing device, the connecting coupling comprises two retaining elements which are held axisymmetrically on the basic body with respect to the longitudinal direction. In this way, the specified greasing device can be pulled over the contact wire without tilting.

According to a further aspect of the invention, a method for greasing a contact wire for the electrical power supply of a pantograph of a rail vehicle comprises the steps of inserting the contact wire into a passage opening of a basic body extending in a longitudinal direction, a transverse direction perpendicular to the longitudinal direction and a vertical direction perpendicular to the longitudinal direction and perpendicular to the transverse direction, whereby the passage opening penetrates the basic body in the longitudinal direction as seen from a front side to a back side as seen in the longitudinal direction, feeding grease into the passage opening via a supply line running at an angle to the passage opening, and pulling the basic body in the longitudinal direction.

In accordance with the invention, the method further comprises the step of wiping off grease which is applied to the contact wire drawn through the basic body at the upper side of the contact wire as seen in the vertical direction.

BRIEF DESCRIPTION OF THE DRAWINGS

The above-described properties, features and advantages of this invention, as well as the manner in which they are achieved, will become clearer in connection with the following description of the embodiments, which are described in more detail in connection with the drawing, in which.

DETAILED DESCRIPTION

Figure 1:
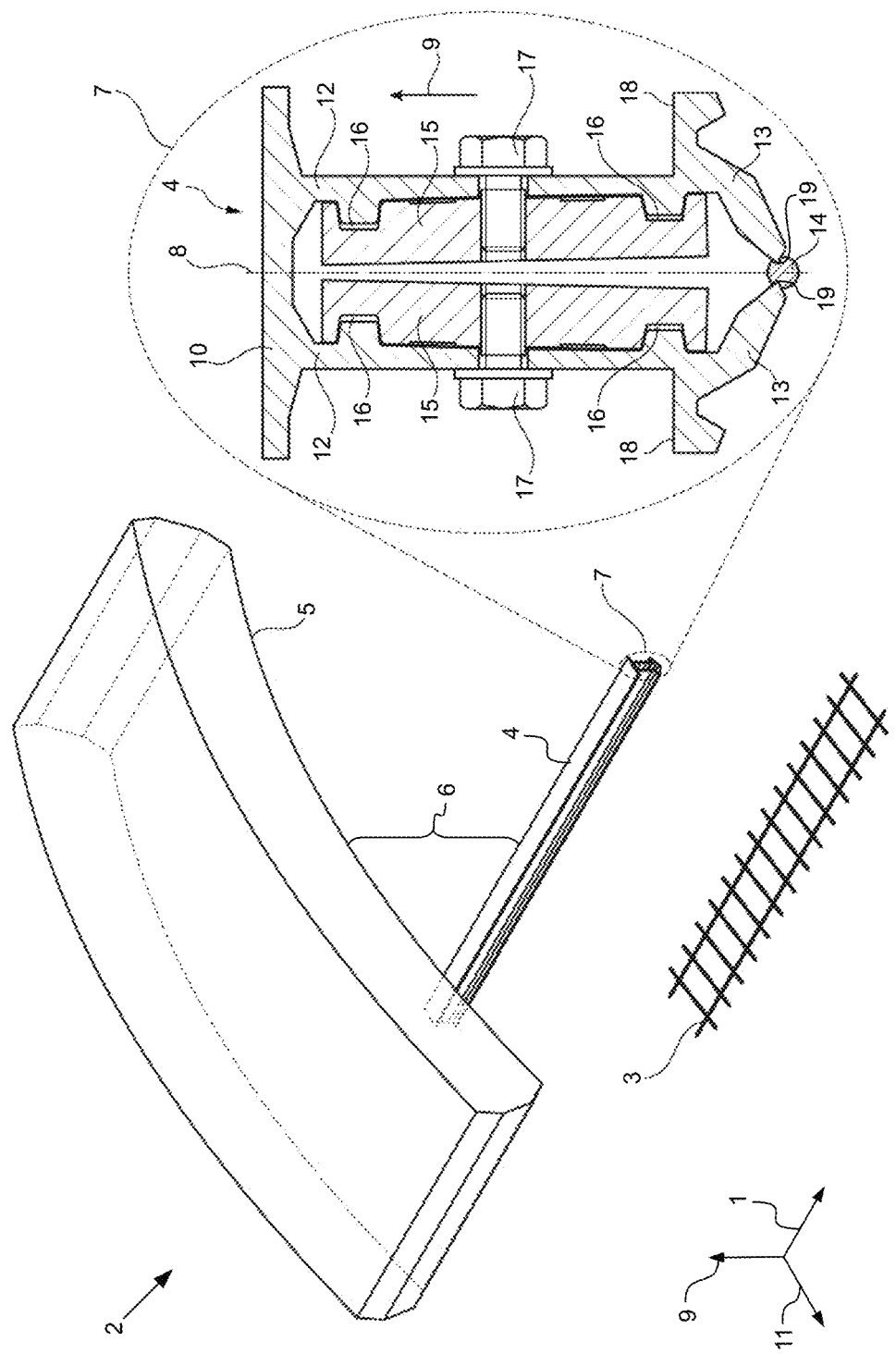
FIG. 1 is a schematic representation of a driving path with a conductor rail in which a contact wire is held.

In the drawings, the same technical elements are provided with the same reference signs, and are only described once. The drawings are purely schematic and, in particular, do not reflect the actual geometric proportions.

Reference is made to FIG. 1 showing a track section 2 extending in a direction of travel 1 or longitudinal direction 1 with a track 3, on which a train not shown here can move electrically driven on track 3. For the electrical power supply of the train, a conductor rail 4 is arranged at a not further referenced height above track 3, also extending in the longitudinal direction 1, from which the train with a not further referenced pantograph can draw electrical current in a manner known per se.

The conductor rail 4 is suspended from a carrier, which is shown in FIG. 1 in the form of a ceiling 5 as an example. Ceiling 5 could, for example, be part of a tunnel or a bridge. The conductor rail 4 can be held at a suspension distance 6 from the ceiling 5 by means of suspension which are not shown here in any further detail.

FIG. 1 shows an enlargement of the profile 7 of the conductor rail 4.

When viewed in profile 7, the conductor rail 4 is axisymmetrical to a profile axis 8. The profile axis 8 runs parallel to a vertical direction 9 of track section 2. Viewed in vertical direction 9, there is a transverse arm 10 on the upper side of the conductor rail 4, of which two tension arms 12 extend at a distance from each other in a transverse direction 11 running at a right angle to the longitudinal direction 1, and at a right angle to the vertical direction 9, against the vertical direction 9. A clamping arm 13 is connected to the end of each tension arm 12 opposite the transverse arm 10, between which a contact wire 14 is held clamped by the tension arms 12.

The conductor rail 4 shown in FIG. 1 is usually made up of a large number of conductor rail sections which, as seen in profile 7 of FIG. 1, are laid against each other at the front end and exactly aligned with each other via fishplates 15. The mutual alignment takes place via an engagement in the vertical direction 9 between the fishplates 15 and the conductor rail sections, which is designed in FIG. 1 as a tongue and groove connection 16. To fix the individual conductor rail sections against each other, screws 17 can be screwed into the fishplates 15.

In order to clamp the contact wire 14 between the clamping arms 13, track sections 18 extending at a connection point between the clamping arms 13 and the tension arms 12 are connected in or against the transverse direction 11, on which a threading carriage not shown in more detail can move.

If water accumulates at the resulting clamping points 19, redox reactions cause local elements to form. Due to the choice of materials in commercially available conductor rails, the distance between the metals at the clamping points 19 in the electrochemical series is sufficiently large to cause weathering damage when water accumulates there. Various approaches have already been proposed to reduce water accumulation in order to avoid the formation of local elements, for example according to WO 2014/067989 A1 with drainage openings. However, the occurrence of water can never be completely avoided, which is why it makes more sense to actively protect clamping points 19 from water.

Figure 2:
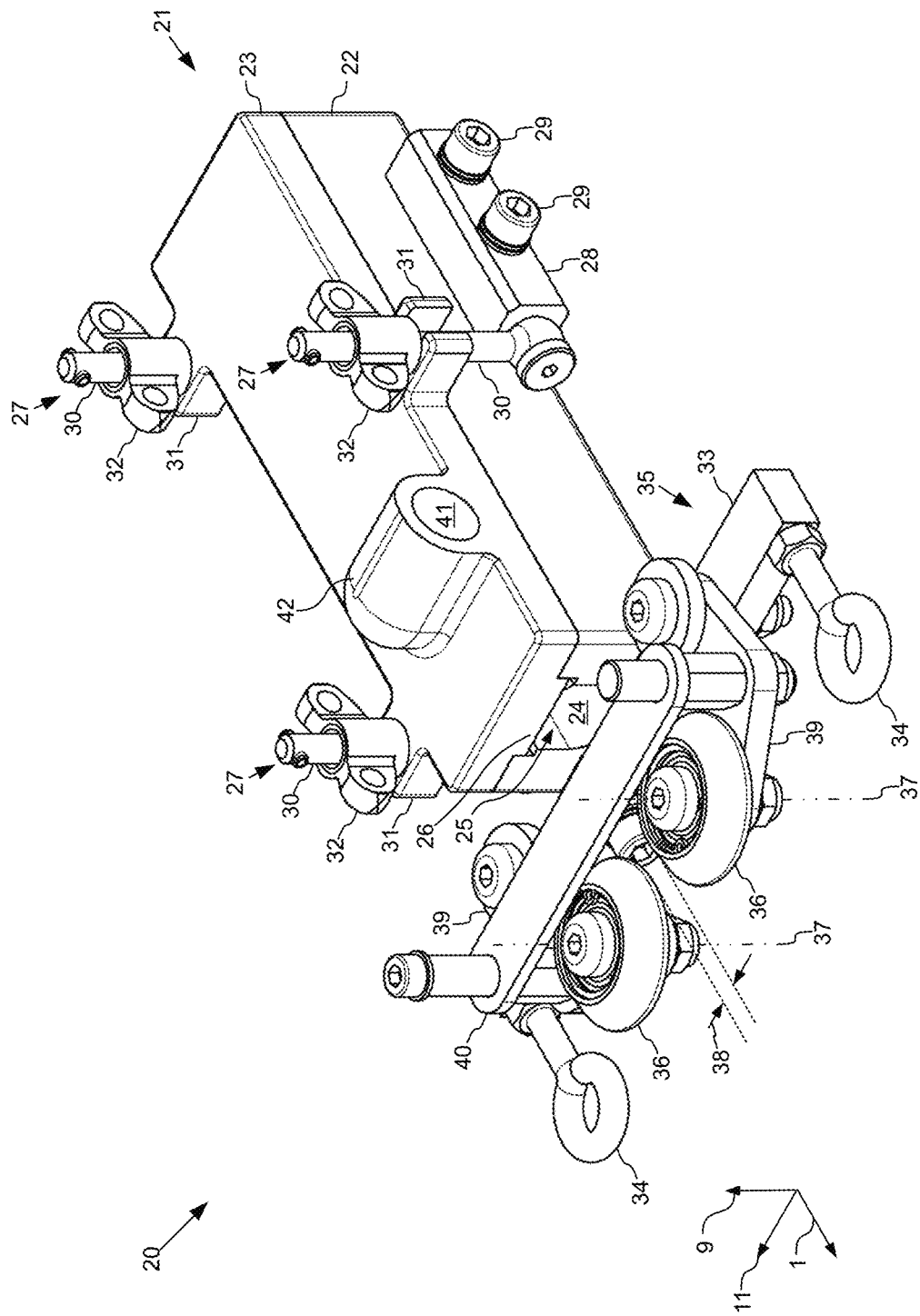
FIG. 2 is a schematic representation of a greasing sleeve for greasing the contact wire from FIG. 1 from a first perspective.
Figure 3:
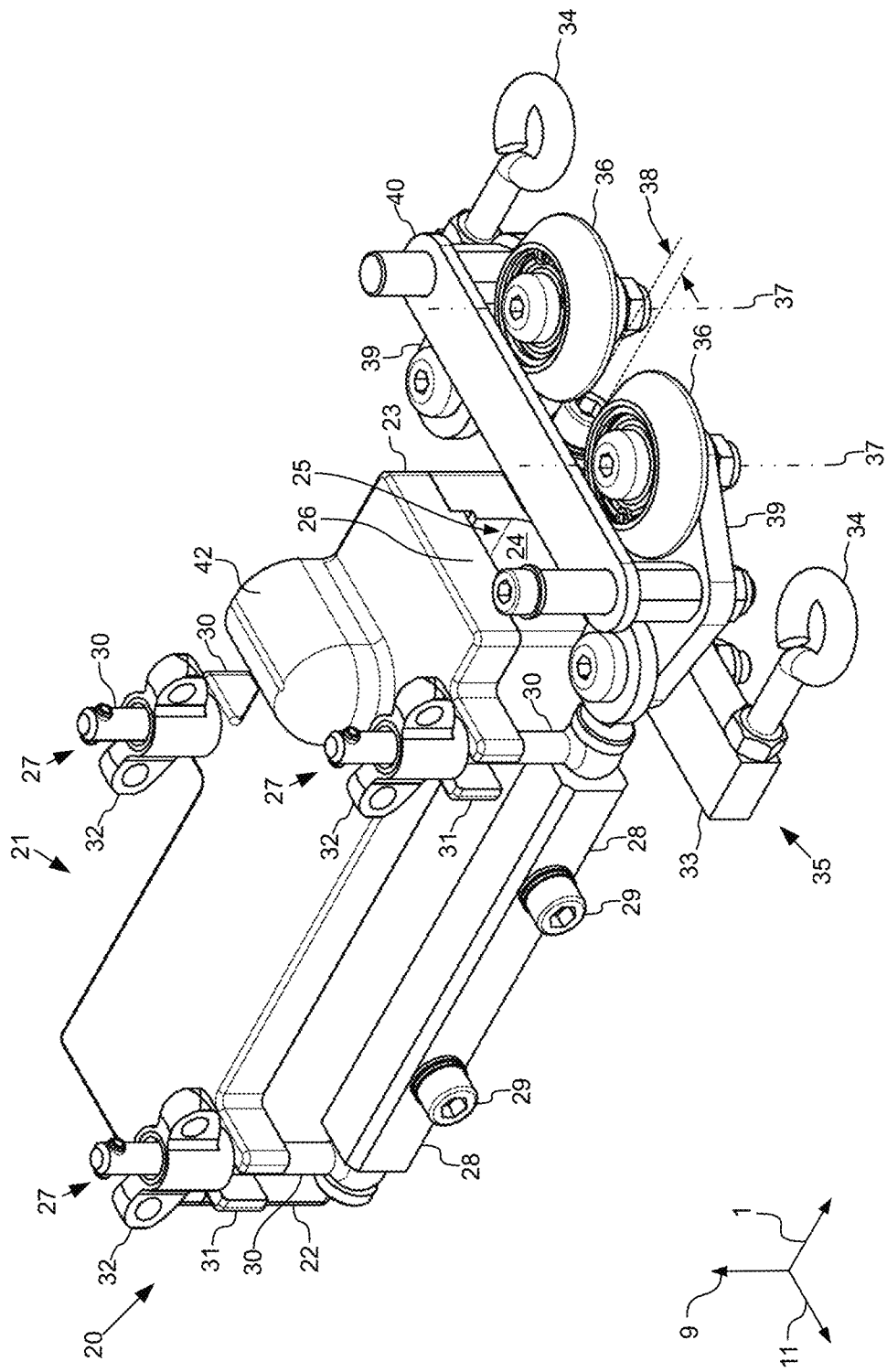
FIG. 3 is a schematic representation of the greasing sleeve from FIG. 2 from a second perspective.

For this purpose, a greasing device 20, also called a greasing sleeve, shown in FIGS. 2 and 3, is proposed, which coats the contact wire 14 with grease in the area of the clamping points 19 immediately before being clamped by the threading carriage in the conductor rail 4, so that after the clamping of the contact wire 14 in the conductor rail 4 no water can approach the clamping points 19 to form a bridge between the conductor rail 4 and the contact wire 14 and thus forms local elements.

The greasing device 20 comprises a basic body 21 comprising, among other things, a guide body part 22 and a cover part 23.

A groove 24 extending in the longitudinal direction 1 is formed on an upper side of the guide body part 22 seen in the vertical direction 9. The groove 24 is open in the longitudinal direction 1 at the face sides of the guide body part 22 which are not referenced further, so that the contact wire 14 can be inserted into the groove 24.

The cover part 23 is placed on the upper side of the guide body part 22, seen in the vertical direction 9, so that the groove 24 is closed and forms a passage opening 25 through the basic body 21. For precise positioning of cover part 23 on the guide body part 22, a positioning projection 26 can be formed on the cover part 23 in the area of each of the unreferenced face sides of the basic body 21 in longitudinal direction 1. These positioning projections 26 engage positively in the groove 24 when the cover part 23 is placed on the guide body part 22 in the transverse direction 11. The cover part 23, which is placed on the guide body part 22, is then fastened to the guide body part 22 by means of three screw connections 27. One screw connection 27 is arranged on the back side of the basic body 21 when viewed in the transverse direction 11, while two screw connections 27 are arranged on the front side.

Each screw connection 27 comprises a fixing strip 28 extending in the longitudinal direction 1, wherein the fixing strips 28 of the screw connections 27 are formed integrally on the front side of the basic body 21 when viewed in the transverse direction 11. The fixing strips 28 are fastened to the guide body part 22 by means of screws 29. A threaded rod 30, which can be swivelled around the longitudinal direction 1, is attached to one face side of each fixing strip 28, when viewed in the longitudinal direction 1, and can be swivelled into one fork element 31 each on the cover part 23. When the threaded rods 30 are swivelled into the fork elements 31, one wing nut 32 each is screwed onto the respective fork element 31 towards the respective fixing strip 28, so that the cover part 23 is pressed onto the guide body part 22, which produces the aforementioned frictional connection. In order to avoid a loss of the wing nuts 32 when the greasing device 20 is in the dismantled state, the upper end of the threaded rods 30 seen in the vertical direction 9 may be equipped with movement limitation means, which are not referenced further for the sake of clarity.

Before the insertion of the contact wire 14 into the groove 24 and thus the passage opening 25 as well as the application of grease to the contact wire 14 therein are dealt with in more detail, it is briefly explained how the greasing device 20 is pulled over the contact wire 14 which is inserted into the passage opening 25 during operation.

For this purpose, the greasing device 20 has a horizontal beam 33, also known as a draw bar, on the front end of the basic body 21 when viewed in the longitudinal direction 1, aligned in the transverse direction 11. At the ends of the horizontal beam 33 when viewed in the transverse direction 11, there are holding elements in the form of eye bolts 34 aligned in the longitudinal direction 1. The horizontal beam 33 and the eye bolts 34 together form a connecting element 35, via which the greasing device 20 can be connected to a pulling mechanism and pulled over the contact wire 14 in the longitudinal direction 1.

On the horizontal beam 33, between the two eye bolts 34, two guide pulleys 36 are held rotatably about one rotation axis 37 each, which are aligned in the vertical direction 9. In addition, the guide pulleys 36 are arranged in the transverse direction 11 at a roller distance 38 from each other. The guide pulleys 36, when viewed from an underside of the basic body 21 seen in the vertical direction 9, are arranged at a not further referenced height, which is equal to a likewise not further referenced height of the passage opening 25, so that the contact wire 14, when pulling the greasing device 20 in a curve of the track 3, can be guided over the guide pulleys 36 in a predetermined rotational position about the longitudinal direction 1 into the passage opening 25. The guide pulleys 36 are each held on a swivel arm 39 so that the position of the guide pulleys 36 can be adapted to the transverse movements of the contact wire 14 in the transverse direction 11. In order to keep the roller distance 38 constant, the swivel arms 39 are connected to each other via a coupling rod 40.

When the greasing device 20 is pulled over the contact wire 14, the contact wire 14 is coated with the said grease. This grease is fed into the passage opening 25 of the greasing device 20 via a supply line 41. The supply line 41 leads through a connection socket 42 which is arranged on an upper side of the cover part 23 when viewed in the vertical direction 9. A supply line not shown in any further detail can be connected to the connection socket 42, which feeds the grease from a source not shown in further detail into the supply line 41. A tap can be arranged between the source and the connection socket 42 to control the supplied quantity of grease. The grease thus accumulated in the passage opening 25 is pressed onto the contact wire 14, which in turn applies the grease.

In practice, the contact wire 14 is very long, and is immediately clamped in the conductor rail 4 during installation on the track section 2 after greasing via the threading carriage. It is therefore difficult, when viewed in the longitudinal direction 1, to thread the contact wire into the passage opening 25 on the face side. The mounting of the greasing device 20 on the contact wire 14 is therefore implemented in the present version in a more practical way. Furthermore, the greasing device 20 allows a particularly effective application of grease to the contact wire 14. This is described in more detail below on the basis of FIGS. 4 to 8.

The passage opening 25 has a funnel-shaped area 42' in which an opening width 43 of the passage opening 25 tapers in the transverse direction 11 against the longitudinal direction 1. This tapering takes place in at least one section of the funnel-shaped area 42', which is connected to the point where the supply line 41 leads into the passage opening 25. If the funnel-shaped area 42' is filled with grease and the contact wire 14 moves against the longitudinal direction 1 through the passage opening 25, the grease accumulates at the end of the funnel-shaped area 42' and is pressed onto the surface of the contact wire 14. In this way, the grease is applied homogeneously to the contact wire 14. The grease supply from the supply line 41 can be adjusted, for example, via the above-mentioned tap, so that no excess grease drips from the greasing device 20. This means that if the amount of grease supplied via supply line 41 is greater than the amount of grease applied to contact wire 14, the excess grease will drip out of the greasing device 20. At the start of operation of the greasing device 20, the abovementioned tap should therefore be set to exactly this condition and slowly turned back until no more grease drips out of greasing device 20. In this way, an optimum grease application is achieved.

The funnel-shaped area 42 is designed as an insert that can be inserted into the groove 24 so that the funnel-shaped area 42 can be adapted to contact wires 14 of different conductor cross-sections. In this way, the funnel-shaped area 42 can be easily adapted by replacing the insert.

When viewed in the longitudinal direction 1 in front of the funnel-shaped area 42', a guiding sleeve 44 is arranged in the passage opening 25. The guiding sleeve 44 has an unreferenced passageway in which the contact wire 14 can be held positively in the vertical direction 9 and the transverse direction 11. In this way, the guiding sleeve 44 corrects the positioning of the contact wire 14 when entering the funnel-shaped area 42' in a certain angular position around the longitudinal direction 1 and in the transverse direction 11, so that the pressure of the grease is applied evenly to both sides when viewed in the transverse direction 11. The abovementioned guide pulleys 36 thus roughly pre-position the contact wire 14, while the guiding sleeve 44 carries out a fine positioning and inserts the contact wire 14 exactly in the middle as well as in a firmly defined rotary position into the funnel-shaped area 42'.

For easy installation on the contact wire 14, the guiding sleeve 44 is made up of a first guiding sleeve half 45 and a second guiding sleeve half 46, which can be assembled with the guiding sleeve 44 by joining in or against the transverse direction 11. The assembled guiding sleeve 44 is held in a guiding sleeve rail 47 in the guide body part 22.

During operation, the contact wire 14 is inserted into one of the guiding sleeve halves 45, 46, and the guiding sleeve 44 is closed by placing the corresponding other guiding sleeve half 46, 45 in or against the transverse direction 11. The assembled guiding sleeve 44 can now be inserted into the guiding sleeve rail 47.

When viewed in the longitudinal direction 1, a wiper sleeve 48 is arranged on the side of the funnel-shaped area 42 opposite the guiding sleeve 44. The wiper sleeve 48 has a passage similar to the guiding sleeve 44, in which, however, a nose 49 aligned against the vertical direction 9 is arranged on the upper side when viewed in the vertical direction 9, which presses on an upper side of the contact wire 14 when viewed in the vertical direction 9. When viewed in the transverse direction 11 to the left and right of nose 49, cavities are formed through which grease can pass the wiper sleeve 48 and be applied to the contact wire 14. A nose width 50 of the nose 49 when viewed in transverse direction 11 is selected in such a way that the cavities are located at the points of the contact wire 14 where the clamping points 19 are provided when being clamped in the conductor rail 4.

Figure 4:
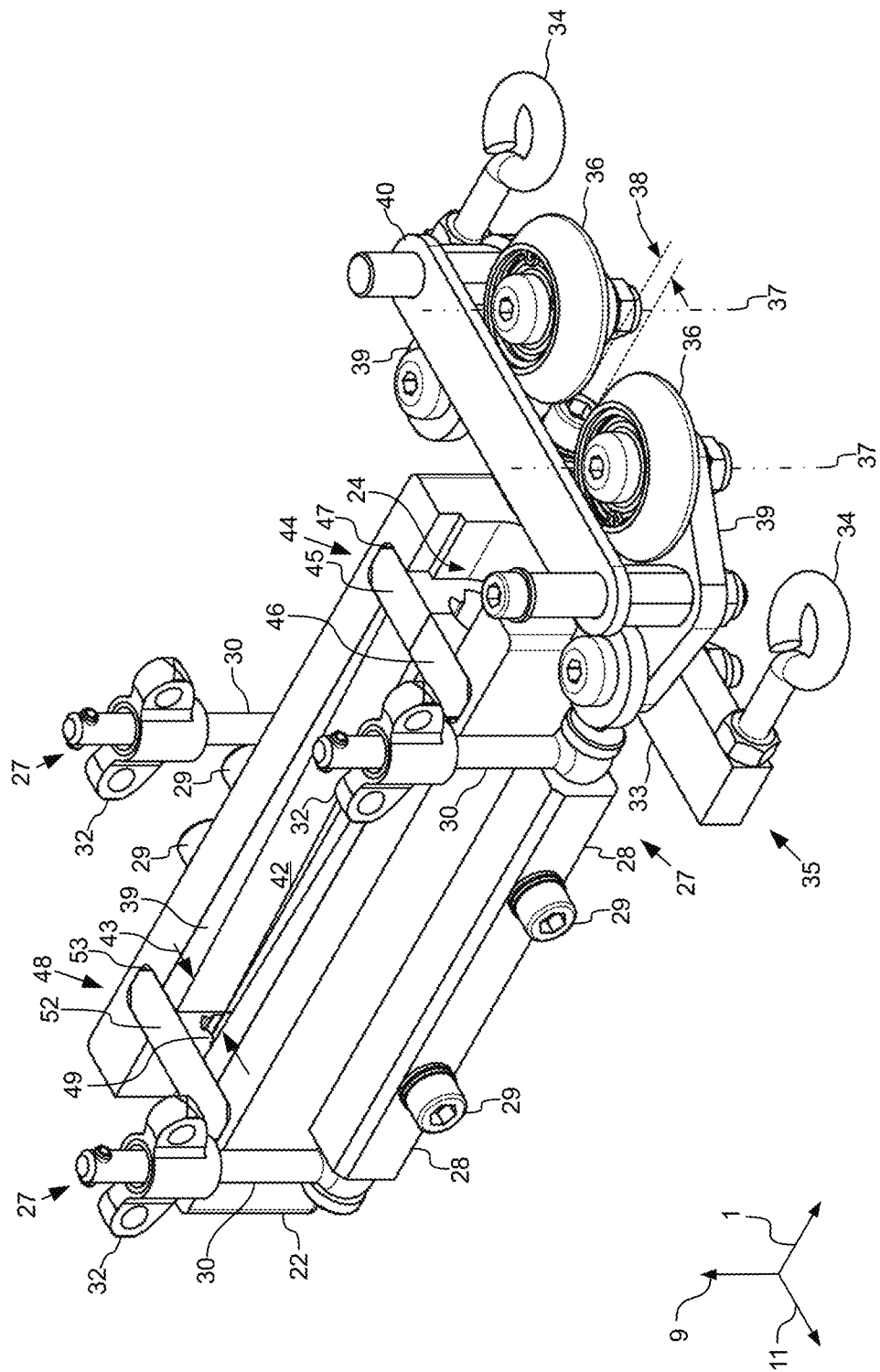
FIG. 4 is a schematic representation of a part of the greasing sleeve from FIG. 2 from the second perspective.
Figure 5:
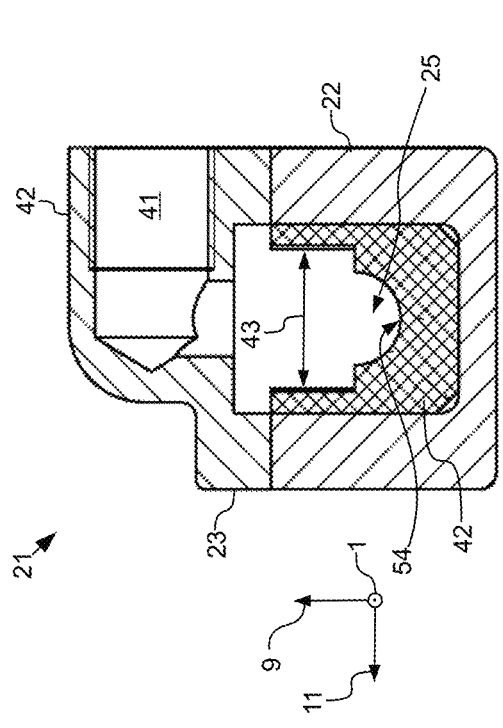
FIG. 5 is a sectional view of the greasing sleeve from FIG. 2 at a first point.
Figure 7:
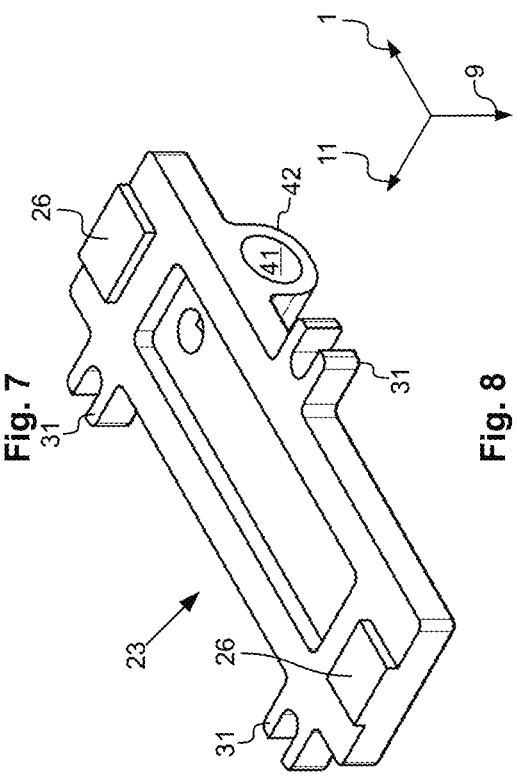
FIG. 7 is a sectional view of the greasing sleeve from FIG. 2 at a third point.
Figure 6:
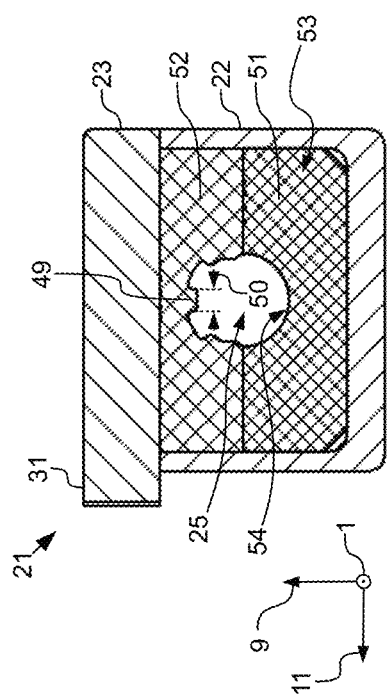
FIG. 6 is a sectional view of the greasing sleeve from FIG. 2 at a second point.
Figure 8:
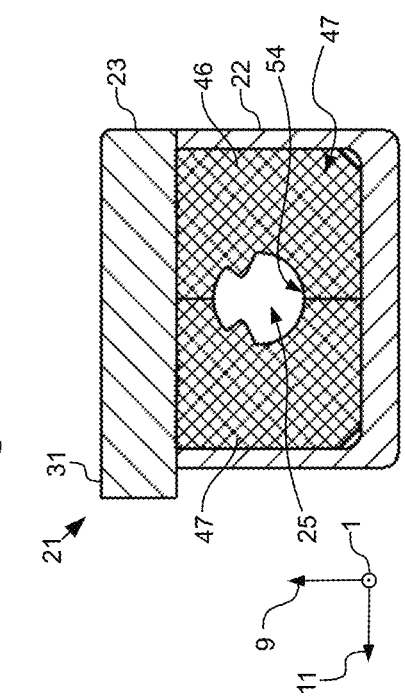
FIG. 8 is a schematic representation of a further part of the greasing sleeve from FIG. 2 from a third perspective.

The wiper sleeve 49 is composed of a lower wiper sleeve half 51 and an upper wiper sleeve half 52, which can be assembled by joining in or against the vertical direction 9. To mount the greasing device 20, the lower wiper sleeve half 51 is inserted into a corresponding wiper sleeve rail 53 in the guide body part 22, and the insert forming the funnel-shaped area 42' is inserted into the groove 24. Then the contact wire 14, around which the guiding sleeve 44 is placed in the manner described above, is inserted into the lower wiper sleeve half 51 and the funnel-shaped area 42', the guiding sleeve 44 being inserted into the guiding sleeve rail 47 in the manner described above. Now the upper wiper sleeve half 52 is inserted into the wiper sleeve rail 53 so that the wiper sleeve 48 is assembled. The greasing device 20 in this mounting condition is shown in FIG. 4. Finally, the cover part 23 is placed on the guide body part 22 in the above manner and screwed tight. Now the grease can be introduced into the passage opening 25 via the supply line 41 in the area of the funnel-shaped area 42' and the grease can be applied to the contact wire 14 in the way already described.

In order to avoid an application of grease at the contact point of the pantograph of the contact wire 14 as far as possible, the passage opening 25 is adapted to a shape of the contact wire 14 on the bottom side 54 when viewed in the vertical direction 9. In this way, the contact wire 14 engages with the bottom side 54 of the passage opening 25 in the vertical direction 9 and in the transverse direction 11 so that no grease can reach this point. The nose 49 presses the contact wire 14 against the bottom side 54, and thus keeps the contact wire 14 free of grease at the contact point to the pantograph. This ensures that the grease is actually only applied to the contact wire 14 in the area of the clamping points 19 and nowhere else.

In the figures, elements with cross-hatching represent elements made of plastic. Hatchings that are crossed in the same way indicate that they are made of the same plastics. The lower half of the wiper sleeve 51 and the upper half of the wiper sleeve 52 differ in the plastic material. Preferably the upper half of the wiper sleeve half 52 is made of a softer plastic material than the lower half of the wiper sleeve half 51.

The invention claimed is:

1. Method for greasing a contact wire for the electrical power supply of a pantograph of a rail vehicle comprising:
    inserting the contact wire (14) into a passage opening (25) of a basic body (21) extending in a longitudinal direction (1), a transverse direction (11) perpendicular to the longitudinal direction (1) and a vertical direction (9) perpendicular to the longitudinal direction (1) and perpendicular to the transverse direction (11), whereby the passage opening (25) penetrates the basic body (21) in the longitudinal direction (1) as seen from a front side to a back side as seen in the longitudinal direction (1),
    feeding grease into the passage opening (25) via a supply line (41) running at an angle to the passage opening (25),
    pulling the basic body (21) in the longitudinal direction (21),
    wiping off grease, which is applied to the contact wire (14) drawn through the basic body (21), at a top side of the contact wire as seen in the vertical direction (9), and
    pressing the contact wire (14) with a nose (49) against a bottom side (54) of the passage opening (25).

2. The method according to claim 1, wherein the passage opening, as seen in the longitudinal direction after the supply line, has the nose oriented against the vertical direction on an upper side, as seen in the vertical direction, which is configured to press the contact wire against the bottom side of the passage opening, as seen in the vertical direction, so that a groove is cut into the grease applied to the contact wire.

3. The method according to claim 1, further comprising:
    penetrating the basic body (21) by the passage opening (25) from a front side, seen in the longitudinal direction (1), to a rear side, seen in the longitudinal direction (1), through which the contact wire (14) is configured to be moved in the longitudinal direction (1).

4. The method according to claim 1, further comprising:
arranging the passage opening (25) in a groove (24) formed in a guide body part (22) of the basic body (21) and covered by a cover part (23) of the basic body (21).

5. The method according to claim 4, further comprising:
guiding supply line (41) through the passage opening (25) until the supply line (41) reaches the cover part (23).

6. The method according to claim 5, wherein the cover part (23) is frictionally connected (30, 31, 32) to the guide body part (22).

7. The method according to claim 6, wherein the passage opening (25) has a funnel-shaped area (42') in which an opening width seen in the transverse direction (1) tapers towards the supply line (41).

8. The method according to claim 7, further comprising:
designing the funnel-shaped area (42) as an insert which is configured to be inserted into the passage opening (25).

9. The method according to claim 8, further comprising:
arranging a guide sleeve (44) in front of the funnel-shaped area (42') as seen in the longitudinal direction, which positions the contact wire (14) at least in the transverse direction (11).

10. The method according to claim 9, wherein the guide sleeve (44) is composed of two guide sleeve halves (45, 46) that are configured to be connected in the transverse direction (11).

11. The method according to claim 10, further comprising:
arranging the nose (49) in a wiper sleeve (48) positioned followed by the funnel-shaped area (42') as seen in the longitudinal direction (1).

12. The method according to claim 11, wherein the wiper sleeve (48) is composed of two wiper sleeve halves (51, 52) that are configured to be connected in the vertical direction (9).

13. The method according to claim 12, further comprising:
arranging two guide pulleys (36) in the longitudinal direction (1) in front of the front side of the basic body (21), which are each rotatable about an axis of rotation (37) aligned in the vertical direction (9) and arranged at a distance (38) from each other in the transverse direction (11) at a same height in the vertical direction (9) in order to deflect the contact wire (14) into the passage opening (25).

14. The method according to claim 13, further comprising:
adapting the passage opening (25) on the bottom side (54) to a shape of the contact wire (14) on a contact wire underside that is configured to be directed towards the pantograph.

15. The method according to claim 14, further comprising:
holding a connecting coupling (35) in the longitudinal direction (1) at the front side of the basic body (21) for connecting a pulling device designed to pull the basic body (21) in the longitudinal direction (1).

16. The method according to claim 15, wherein the connecting coupling (35) comprises two holding elements (34) which are held on the basic body (21) axisymmetrically (33) with respect to the longitudinal direction (1).

* * * * *